United States Patent
Skafte et al.

(10) Patent No.: US 12,331,722 B2
(45) Date of Patent: *Jun. 17, 2025

(54) BLADE MONITORING BY ACTIVELY PROMOTING BLADE VIBRATIONS

(71) Applicant: VESTAS WIND SYSTEMS A/S, Aarhus N. (DK)

(72) Inventors: Anders Skafte, Egå (DK); Gustavo Oliveira Violato, Risskov (DK); Fabio Caponetti, Åbyhøj (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 63 days.

This patent is subject to a terminal disclaimer.

(21) Appl. No.: 17/923,461

(22) PCT Filed: Apr. 29, 2021

(86) PCT No.: PCT/DK2021/050135
§ 371 (c)(1),
(2) Date: Nov. 4, 2022

(87) PCT Pub. No.: WO2021/223823
PCT Pub. Date: Nov. 11, 2021

(65) Prior Publication Data
US 2023/0204010 A1   Jun. 29, 2023

(30) Foreign Application Priority Data
May 4, 2020   (DK) .............. PA 2020 70284

(51) Int. Cl.
*F03D 7/02* (2006.01)
*F03D 1/06* (2006.01)
(Continued)

(52) U.S. Cl.
CPC .............. *F03D 7/0224* (2013.01); *F03D 1/06* (2013.01); *F03D 7/024* (2013.01); *F03D 7/042* (2013.01);
(Continued)

(58) Field of Classification Search
CPC ...... F03D 7/0224; F03D 7/024; F03D 7/0298; F03D 7/0296; F03D 7/042; F03D 7/043;
(Continued)

(56) References Cited

U.S. PATENT DOCUMENTS 11,698,052 B2 *  7/2023  Fu .......................... F03D 7/047
                                                              416/31
12,135,012 B2 * 11/2024  Thomsen .............. F03D 7/0224
(Continued)

FOREIGN PATENT DOCUMENTS

EP       2447527 A1 *   2/2012
WO    2016012372 A1     1/2016
(Continued)

OTHER PUBLICATIONS

Danish Patent and Trademark Office, 1st Technical Examination including the Search Report and Search Opinion for Application PA 2020 70284 dated Sep. 28, 2020.
(Continued)

*Primary Examiner* — Christopher Verdier
(74) *Attorney, Agent, or Firm* — Patterson + Sheridan, LLP

(57) ABSTRACT

Techniques are provided for monitoring blades of a wind turbine by actively promoting blade vibrations by imposing a pitch actuation signal. A method of operating a wind turbine is disclosed where for each blade of a wind turbine, vibrations of the blade are actively promoted by imposing a pitch actuation signal to the pitch actuator, and at least one parameter relating to the blade vibration is determined.

17 Claims, 3 Drawing Sheets

(51) Int. Cl.
*F03D 7/04* (2006.01)
*F03D 17/00* (2016.01)
*G01M 5/00* (2006.01)

(52) U.S. Cl.
CPC ............ *F03D 7/045* (2013.01); *F03D 17/011* (2023.08); *F03D 17/013* (2023.08); *F03D 17/014* (2023.08); *F03D 17/015* (2023.08); *F03D 17/017* (2023.08); *G01M 5/0016* (2013.01); *G01M 5/0066* (2013.01); *F05B 2260/83* (2013.01); *F05B 2270/331* (2013.01); *F05B 2270/334* (2013.01); *F05B 2270/807* (2013.01); *F05B 2270/808* (2013.01)

(58) Field of Classification Search
CPC ........ F03D 7/045; F03D 17/00; F03D 17/011; F03D 17/015; F03D 17/013; F03D 17/014; F03D 17/017; F05B 2260/83; F05B 2270/32; F05B 2270/331; F05B 2270/332; F05B 2270/334; F05B 2270/807; F05B 2270/808; F05B 2260/96; G01M 5/0066; G01M 5/0033; G01M 5/0016
See application file for complete search history.

(56) References Cited

U.S. PATENT DOCUMENTS

| | | | |
|---|---|---|---|
| 2011/0182732 | A1 | 7/2011 | Baba |
| 2011/0229300 | A1* | 9/2011 | Kanev ................... F03D 7/043 415/33 |
| 2012/0301295 | A1 | 11/2012 | Mutius |
| 2013/0195657 | A1 | 8/2013 | Lauritsen et al. |
| 2015/0110624 | A1 | 4/2015 | Zhou et al. |
| 2017/0184077 | A1 | 6/2017 | Caponetti et al. |

FOREIGN PATENT DOCUMENTS

| | | | |
|---|---|---|---|
| WO | WO-2017/092773 A1 * | 6/2017 | |
| WO | 2018113877 A1 | 6/2018 | |
| WO | 2019214786 A1 | 11/2019 | |
| WO | 2021223823 A1 | 11/2021 | |

OTHER PUBLICATIONS

PCT, International Search Report for Application PCT/DK2021/050135 dated Jul. 29, 2021.
PCT, Written Opinion of the International Searching Authority for Application PCT/DK2021/050135 dated Jul. 29, 2021.

* cited by examiner

BLADE MONITORING BY ACTIVELY PROMOTING BLADE VIBRATIONS

FIELD OF THE INVENTION

The present invention relates to blade monitoring of a wind turbine by actively promoting blade vibrations by imposing a pitch actuation signal.

BACKGROUND OF THE INVENTION

Modern wind turbines continue to increase in size, and with the increased size also the wind turbine blades increase in size and thereby also costs. A modern wind turbine blade may be more than 50 meters long. In view of the invested capital in wind turbines, there is benefit in monitoring the structural integrity of the wind turbine rotor blades. Both to ensure timely service, but also as blade damage may lead to a need for replacement of the blade, or even catastrophic failure of the entire turbine. This holds for both new turbines, as well as for already installed and operating turbines.

Systems and methodologies capable of continuously or regularly monitoring the structural integrity of the rotor blades for early detection of structural damages and avoid a critical failure are therefore of interest. One example of such a system is disclosed in WO2016012372, which utilizes a mechanical actuator attached to a blade surface for injecting mechanical energy into the blade structure, and a vibration sensor for measuring the resulting mechanical waves. The vibrational signal is subsequently analysed.

Still there is a need for improved structural damage detection systems and methodologies for wind turbine rotor blades, and it is against this background that the invention has been devised.

SUMMARY OF THE INVENTION

In accordance with a first aspect, there is provided a method of operating a wind turbine, the wind turbine comprising a rotor with one or more pitch adjustable rotor blades, where each blade comprises a pitch actuator for adjusting the pitch angle, the method comprising actively promote blade vibrations by imposing a pitch actuation signal to the pitch actuator and determining at least one parameter relating to the blade vibration.

The inventors of the present invention have realized that by utilizing the pitch actuator to actively promote blade vibrations, the need for attachment of a dedicated actuation system is removed. Moreover, as wind turbines are often located at remote sites, there is a benefit in the ability to perform tests for detection of structural damage without the presence of technical personnel on site. Additionally, embodiments of the invention offer the advantage of testing wind turbine blades on a continuous basis, and not only as a reaction to a possible fault or detected fault.

In a further aspect, the invention relates to a computer program product. The computer program product may be provided on a computer readable storage medium or may be downloadable from a communication network. The computer program product comprises instructions to cause a data processing system, e.g., in the form of a controller, to carry out the instructions when loaded onto a data processing system. The computer program product may be provided to implement any of the elements of the other aspects of the invention.

In another aspect, the invention relates to a control system for a wind turbine. In general, the control system may be implemented on a unit or collection of functional units which comprises one or more processors, input/output interface(s) and a memory capable of storing instructions can be executed by a processor. The control system may be provided to implement any of the elements of the other aspects of the invention.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
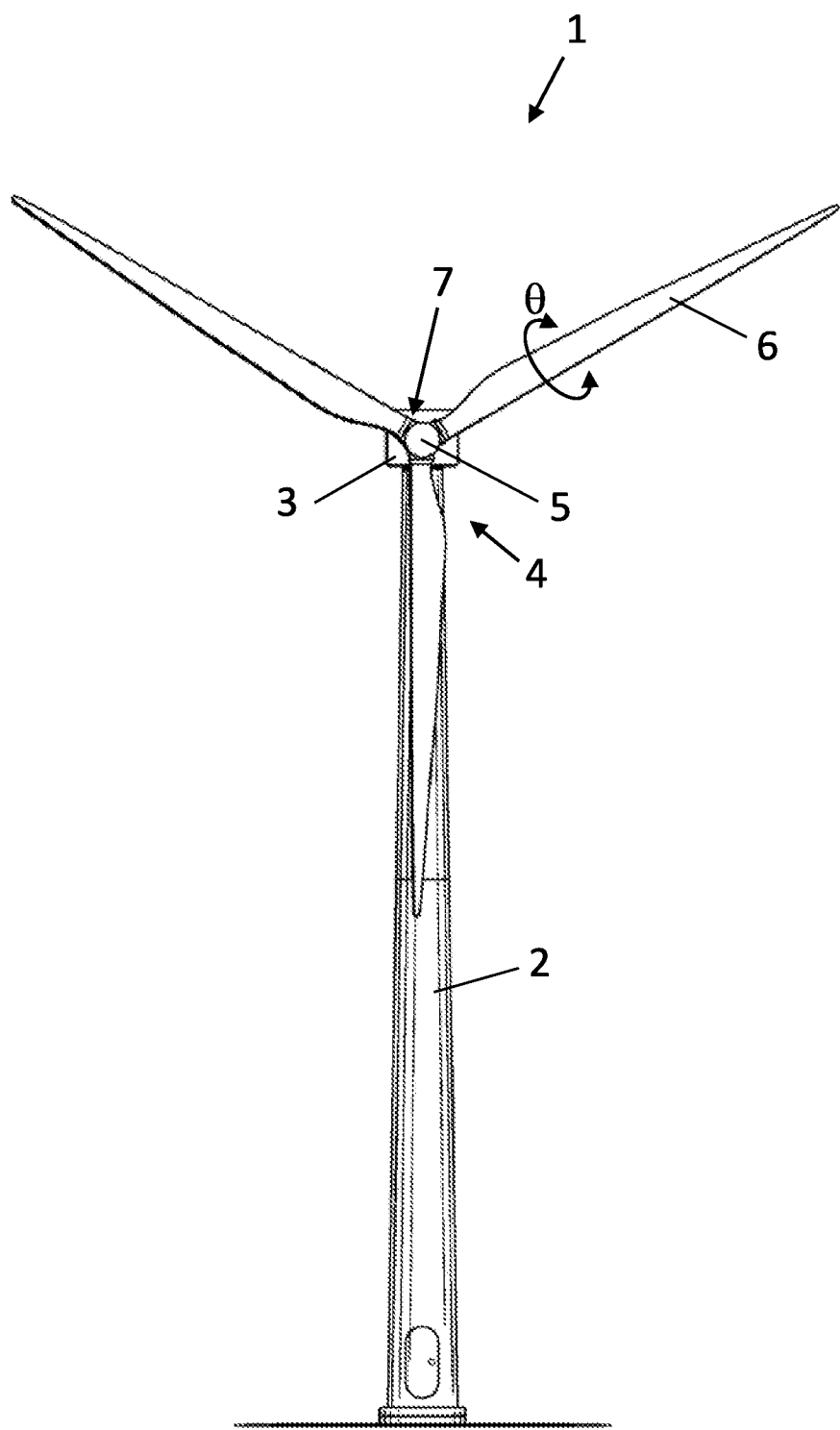
FIG. 1 illustrates, in a schematic view, an example of a wind turbine.

FIG. 1 illustrates, in a schematic view, an example of a wind turbine 1. The wind turbine 1 includes a tower 2, a nacelle 3 disposed at the apex of the tower, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1. The rotor 4 of the wind turbine includes a central hub 5 and a plurality of blades 6 that project outwardly from the central hub 5. In the illustrated embodiment, the rotor 4 includes three blades 6, but the number may vary. Moreover, the wind turbine comprises a control system. The control system may be placed inside the nacelle, in the tower or distributed at a number of locations inside (or externally to) the turbine and communicatively connected. The rotor blades are pitch-adjustable, i.e. the blades can be rotated, θ, around an axis extending along the blade. The rotor blades can be adjusted in accordance with a collective pitch setting, where each of the blades are set to the same pitch value. In addition to that, the rotor blades are adjustable in accordance with individual pitch settings, where each blade may be provided with an individual pitch setpoint. The pitch angle is adjusted by use of a pitch actuator 7 placed in the hub 5. Pitch actuators are known in the art and may typically be hydraulic or electrical.

In operation, wind turbine blades are constantly subjected to dynamic loads, which over time can cause damage, such as in the form of cracks and delamination. A damage in the blade will change the physics of the blade, and thereby also the way the blade vibrates. In accordance with the embodiments of the present invention, a forced response, generated from the pitch system, is analysed. By analysing a forced response obtained under controlled condition the uncertainties from the stochastic nature of the wind is reduced.

Figure 2:
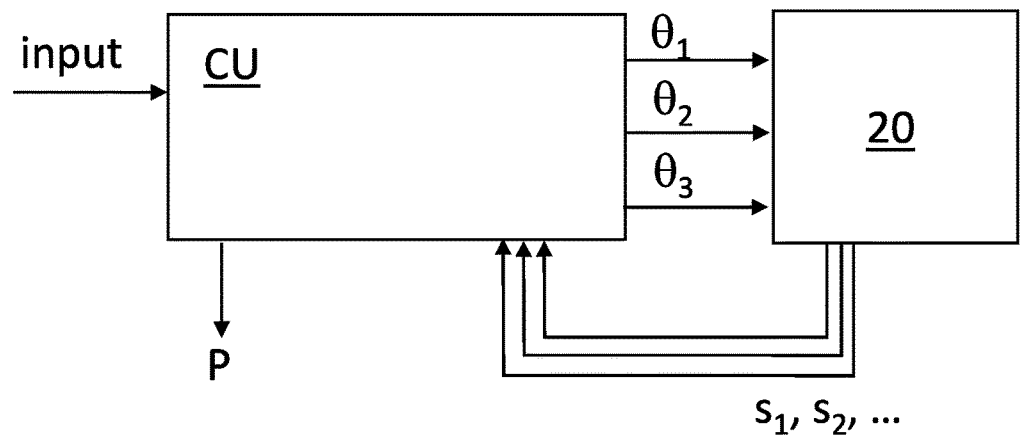
FIG. 2 schematically illustrates a general embodiment of a controller unit.

FIG. 2 is a diagram which schematically illustrates a general embodiment of a controller unit CU that is arranged for determining pitch modification signals ($\theta_1$, $\theta_2$, $\theta_3$) to be imposed as pitch actuation signals to the pitch actuators of the respective blades, here generally illustrated as system 20, and thereby actively promote blade vibrations, and subsequently determine at least one parameter P relating to the blade vibration. The parameter may be based on one or more sensor signals $s_1$, $s_2$, . . . . In this regard, it is mentioned that the parameter may be one of the sensor signals, or may be determined from a calculation based on one or more of the sensor signals.

Figure 3:
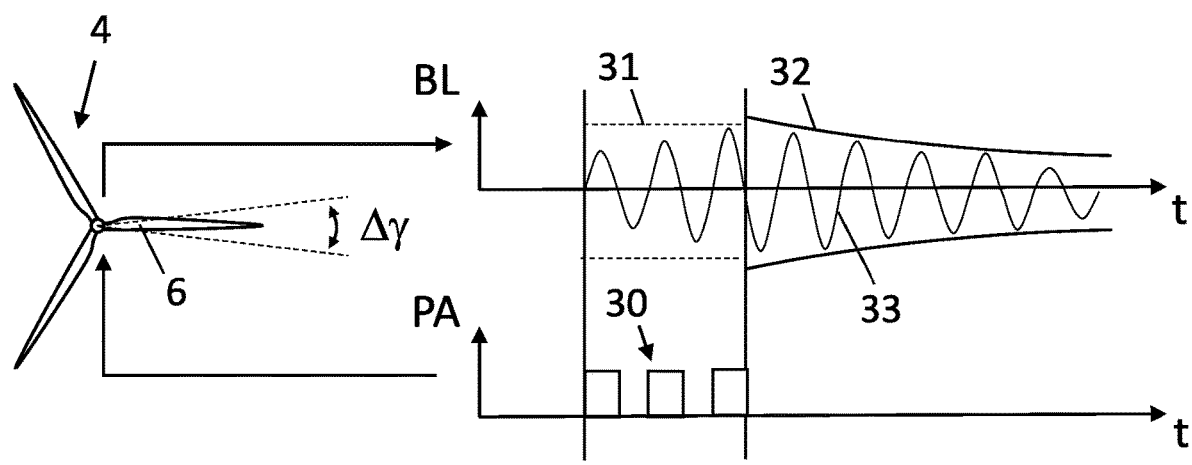
FIG. 3 schematically illustrates an embodiment of actively promoted blade vibrations.

FIG. 3 schematically illustrates a chart of an embodiment wherein the rotor 4 is at standstill with a blade on which active blade vibration promotion is conducted is in a well-defined position within the rotor plane. In this embodiment a single blade is handled at the time and the selected blade 6 is positioned horizontal. In other embodiments, the rotor blade may be in a different position, as well as the rotor 4 may be in an idling operational mode or may be rotating at a controlled speed. In an embodiment with a rotating rotor, the application of the pitch actuation signal 30 may be correlated with the blade position in the rotor plane, e.g., by use of a rotor position sensor, such that the application of the pitch actuation signal is conducted in a predefined angular range within the rotor plane. In the illustrated example, the application of the pitch actuation signal 30 could be in a range of a few degrees around the horizontal position, $\Delta_\gamma$.

In general, the pitch actuation signal may be a time varied signal. In the embodiment illustrated in FIG. 3, the pitch actuation signal PA is a signal 30 comprising timely separated pulses in series. In the illustrated example, the pulses are square pulses, other types of pulses, e.g. burst pulses are envisioned. Also such signals as harmonic signals and wavelet signals may be used.

In an embodiment, the pitch actuation signal may be imposed for a specified time duration, or it may be exposed until a monitoring parameter reaches a threshold 31, or as a combination of the two. In the illustrated example, the monitoring parameter is a blade load signal, BL, such as a signal indicative of the blade root load. Thus while the pitch actuation signal is being imposed, a selected monitoring parameter is monitored, and if the monitoring parameter reaches a threshold, the active promotion of the blade vibration is stopped. The determination of the at least one parameter may be based on a sensor signal. Examples of relevant sensor signal include, but are not limited to, signals being selected from the group of: a blade load sensor for detecting a flapwise load signal, a blade load sensor for detecting an edgewise load signal, an accelerometer positioned in the blade, a GPS-sensor positioned in the blade, a gyroscope positioned in the blade.

In one embodiment, the at least one parameter relating to the blade vibration is determined on the basis of a decay of the selected monitoring parameter, which in the example illustrated in FIG. 3, is a decay 32 of the blade load. Such parameters as decay time constants, damping constants, etc. may be determined.

In other examples, the frequency spectrum of the decaying signal 33 may be determined, e.g. based on Fourier analysis, and compared to baseline frequency spectrum.

In an embodiment, the rotor is rotating with a controlled speed, and the active blade vibration promotion is conducted while the rotor is rotating.

In an embodiment using a rotating rotor, vibrations along the edgewise blade direction, that is vibrations or oscillations along the chord between the trailing edge and the leading edge of the blade may actively be promoted by selectively controlling the frequency content in the pitch actuation signal. In general when referring to 'an edgewise rotor blade vibration' such reference is made to the first edgewise bending mode, however the disclosure made herein is also relevant to higher order edgewise bending mode with the appropriate adaptations, as well as whirling modes. An edgewise vibration may be measured and/or detected in different manners.

In one embodiment, the edgewise vibration is measured at the blade root by means of blade load sensors placed at each blade root in a manner so that the sensor detects loading in the edgewise direction. Such sensor may in embodiments be a strain gauge sensor or an optical Bragg-sensor. As the sensors are placed on the rotating blade, such edgewise load signals for each of the adjustable rotor blades are measured in the rotating reference frame of the rotor.

Figure 4:
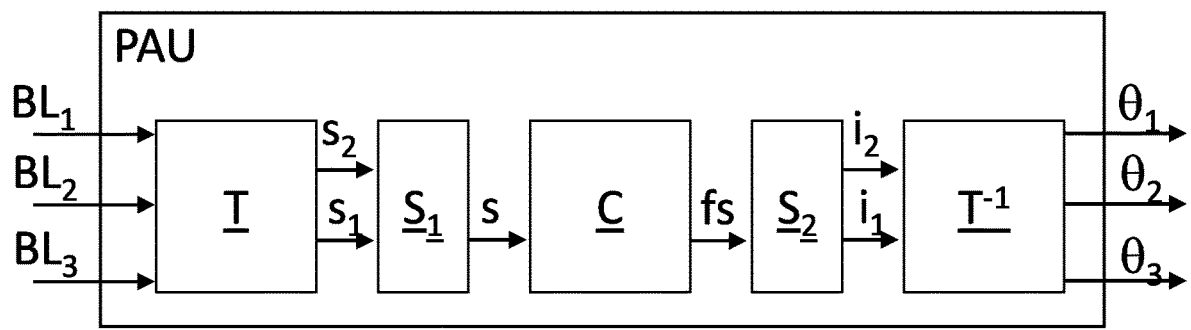
FIG. 4 illustrates an embodiment of a control module referred to as pitch actuation unit.

FIG. 4 illustrates an embodiment of a control module referred to as pitch actuation units (PAU) for implementing into the controller unit CU of FIG. 2. In the pitch actuation unit, pitch modification signals ($\theta_1$, $\theta_2$, $\theta_3$) are being determined based on input signal(s), the input signals are illustrated as being edgewise load signals, $BL_1$-$BL_3$, however further input signals may be used, including rotor azimuth.

The PAU control unit determines pitch modification signals ($\theta_1$, $\theta_2$, $\theta_3$) for each rotor blade, which are set as the pitch actuation signals for each blade to actively promote blade vibrations.

FIG. 4 schematically illustrates an embodiment which, based on an m-blade coordinate transformation (T) in the form of a Coleman transformation, determines pitch modification signals, which, when applied by the pitch actuator, generates pitch actuation signals that actively promote edgewise blade vibrations.

The pitch actuation unit PAU is arranged to receive an edgewise load signal for each of the adjustable rotor blades ($BL_1$ to $BL_3$). The edgewise load signal may be measured in a rotating reference frame. The edgewise load signals are coordinate transformed by an m-blade coordinate transformation in the form of a Coleman transformation T. The Coleman transformation takes the three rotating signals into a reference frame along a first, $s_1$, and a second, $s_2$, reference direction. This reference frame may be referred to as a whirling reference frame. The output of the Coleman transform is two signals: $s_1$, $s_2$. In embodiments of the present invention, either the first or the second stationary reference direction is selected, $S_1$, to obtain a selected signal component s. The selected signal component s is filtered at either a backward whirling frequency or a forward whirling frequency to obtain a filtered signal component fs. The filtering is done with the signal block C.

The selected signal component may be filtered to couple the output of the Coleman transform to a selected backward whirling component of the edgewise vibration or a selected forward whirling component so that the filtered signal component reflects the magnitude (such as the amplitude or the power) of the selected component of the backward or forward whirling.

Having extracted a measure of the strength of the selected whirling component in the stationary whirling reference frame, a corresponding pitch moment to be applied in the rotating frame is determined by the inverse m-blade coordinate transformation by use of the inverse Coleman transformation to the filtered signal component. The pitch modification signals ($\theta_1$, $\theta_2$, $\theta_3$) are thereby obtained and can be imposed to the pitch actuator.

In an embodiment, the filtering of the selected signal comprises applying a bandpass filter including the backward whirling frequency or the forward whirling frequency. That is, a bandpass filter may be glaced around the edgewise vibration frequency f shifted either backwards or forwards by the rotor frequency, that is a bandpass filter may be placed at either (f−1P) or (f+1P).

In general, a backward whirling edge frequency is to be understood as an edgewise frequency of a given order, f, subtracted with the rotor frequency. Typically the edgewise frequency is the first order edgewise frequency and the rotor frequency is 1P. However other orders may be relevant in certain situations. A forward whirling frequency is a corresponding frequency but where the edgewise frequency of a given order, f, is added with the rotor frequency 1P.

The filtering includes, either as an integrated function or as a separate function, the application of a gain to promote the edgewise vibrations to a predefined degree, as determined by the gain. In particular, the filtering of the selected signal applies a positive gain to the selected signal. That is the signal being multiplied with a positive value. By applying a positive gain, it may be ensured that the filtered signal is in phase with the selected signal. Thereby it may be ensured that the applied moment by the pitching is applied to promote the vibration.

Figure 5:
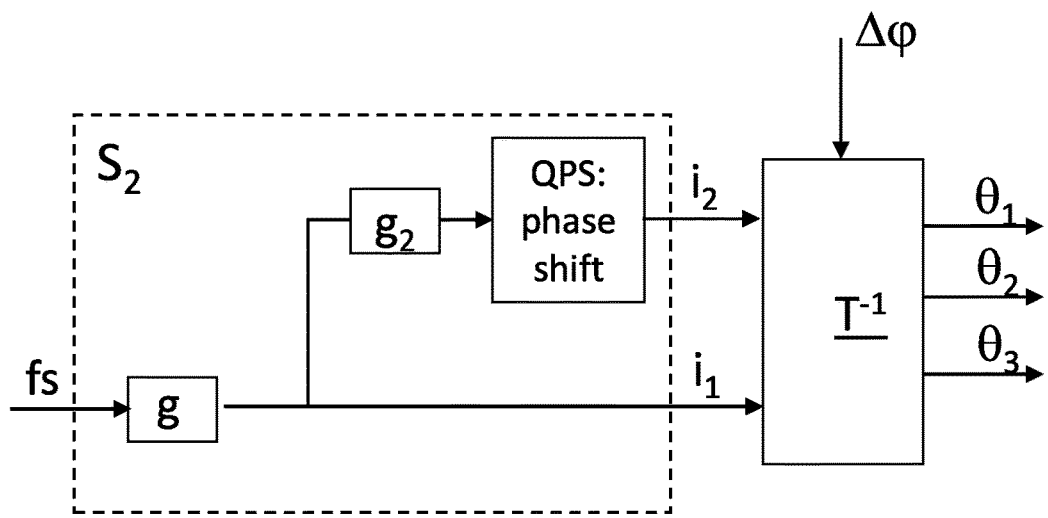
FIG. 5 illustrates an embodiment of a filter module of the pitch actuation unit of FIG. 4.

The inverse m-blade coordinate transformation may take as input a first signal $i_1$ and a second signal $i_2$. The second signal may in a general embodiment be set to be zero. In this embodiment, the selector $S_2$ set the first signal $s_1$ as the filtered signal component fs and the second signal $s_2$ to be zero. However in embodiments the second signal may be determined by further filtering the filtered signal with a further signal filter with a quadrature phase shift filter phase response (QPS). This is illustrated in FIG. 5.

A quadrature phase shift filter shifts the phase with 90°, and the second signal is thus determined as the first signal with a 90 degrees phase shift.

In an embodiment, the 90 degrees phase shift is obtained by applying a filter in the form of a leaky integrator to the first signal. The leaky integrators can be implemented as 1st order low pass filters tuned with a break frequency below the rotor frequency.

By determining the second signal as the first signal with a 90 degrees phase shift, the pitch modification signal is obtained as:

$$\theta_k = A \sin\left((\omega t \mp \Omega t) + \phi \pm \frac{2\pi}{3}(k-1)\right)$$

where the sign (±) depend upon whether or not the second signal is shifted +90° or −90°.

Thus, the signal filter (QPS) may be implemented for selecting either a positive filter phase response or a negative filter phase response.

An advantage of applying the filter with a quadrature phase shift filter phase response (QPS) to obtain the second signal is that the aspect of splitting the frequency content by the Coleman transform in the pitch actuation signal can be avoided (or at least reduced). The frequency content being split into a low frequency component and a high frequency component centred around the input frequency. Thereby if the quadrature phase shift filter is not applied, the resulting pitch modification signals will include frequency content at both the high frequency and at the low frequency. That is the pitch modification signals will include frequency content at the edgewise frequency f+1P and f−1P. In an embodiment, where the quadrature phase shift filter is not applied the reduced frequency content in the actuation signals may still be obtained by use of notch filters applied to each of the pitch modification signals ($\theta_1$, $\theta_2$, $\theta_3$). The notch filter being applied to notch out either the frequency content at f+1P or at f−1P depending on the frequency content that should be removed. The notch filter having a predefined bandwidth to ensure a proper frequency interval being notched out.

FIG. 5 further illustrates optional gains to be applied either as a common gain g, or as an individual gain $g_2$. By proper selection of the gains as positive gains, promotion of blade vibrations can be ensured.

In an embodiment the inverse m-blade coordinate transformation $T^{-1}$ may include a phase shift $\Delta_\varphi$ to adjust the phase of the filtered signal component. By including a phase shift into the inverse transform the actual timing of when the pitch actuation is applied can be adjusted. This may be needed in order to compensate for computational time delays or system delays, such as delays incurred by the pitch actuator. In this regard it is mentioned that it is possible to obtain similar effect of the pitch actuation by adjusting the phase shift and adjusting the gains as the resulting signals are oscillating. A proper combination of signal sign and timing can be obtained by a tuning of the system to ensure a promotion of the blade vibrations. That is, even with negative gains, a proper phase shift may be found to ensure promotion of the blade vibrations. It is within the abilities of the skilled person to perform such a tuning.

Figure 6:
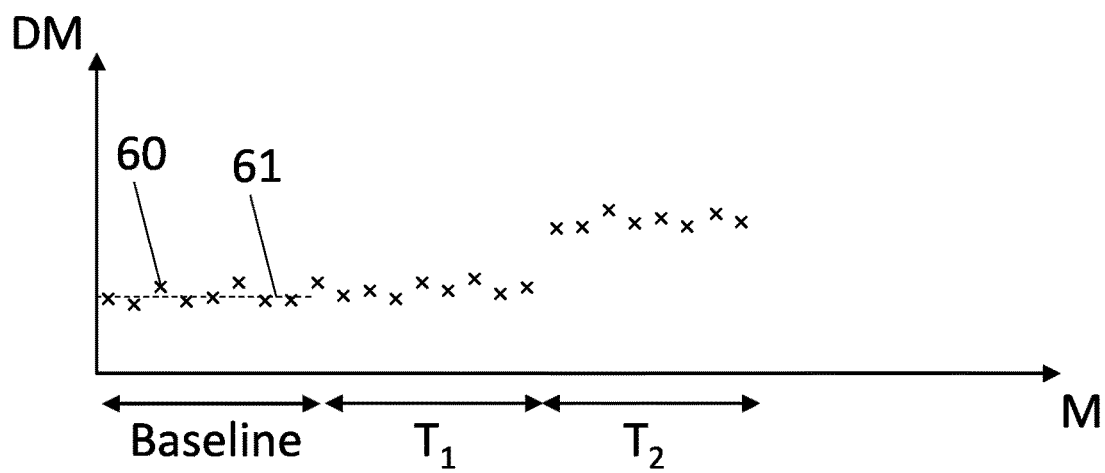
FIG. 6 illustrates a schematic graph which shows the occurrence of a damage, as determined by utilizing an embodiment of the present invention.

FIG. 6 illustrates a schematic graph which show the occurrence of a damage, as determined by utilizing an embodiment of the present invention.

A damage measure (DM) is established. The damage measure being related to the at least one parameter as determined during the active promotion of the blade vibrations. This parameter may e.g. frequency peak location, decay time, damping constants, etc.

In a period where a blade is known to be in a healthy state, e.g. in a period following commissioning of the turbine, in a period following inspection, replacement or repair of one or more blade, a baseline is established. The baseline may also be established for a collection of turbines with comparable blades, e.g. turbines of a wind park. In this manner a higher statistical certainty may be obtained.

A baseline 61 is established by determining the at least one parameter 60 relating to the blade vibration a number of times. In this manner a number of measurements M are made. A baseline may e.g. be obtained by applying a principal component analysis based on the variance of the measurements.

Subsequently, after a period of operation has endured, a test determination of the at least one parameter relating to the blade vibration is done and compared to the baseline. In FIG. 6, two such tests are shown. In a first test $T_1$, the data points are comparable to the baseline, indicating that blade damage has not occurred. In a second test $T_2$, the data points lie at a different level, indicating a blade damage has occurred.

In the schematic graph of FIG. 6, it is visually clearly shown that the data points of $T_2$ is at another level than the baseline. In a computerized implementation, the test determination may be done by using a distance measure between the data points of the test determination of the at least one parameter and the baseline. In an embodiment, the distance measure may be the Mahanalobis distance.

As is illustrated in FIG. 6, the tests comprise a number of data points in the form of the damage measure (DM). In a general embodiment, such tests may be performed at different times during the operational life of the wind turbine.

In an embodiment, an operational condition of the wind turbine is determined, and if the operational condition fulfil a test criterion, the test is automatically performed. In this manner it can be ensured that the test is automatically restarted from time to time, w % ben the operational condition is fulfilled. In general, a number of operational conditions may be monitored. The test may be performed remotely if the operational condition is fulfilled. In this situation, the test may not be autonomously performed by the turbine, but conducted under remote surveillance of technical personnel following fulfilment of the test criterion.

In embodiment, the operational condition may be such conditions as a low wind condition. In such an embodiment, if the wind is below a given wind speed threshold for a specified period of time the test may be initiated. Other operational conditions include detecting if the turbine is in idling mode. Also such conditions as the turbine being in a service mode may be used.

In service mode, a turbine is normally stopped during the service. In this manner before the turbine is restarted, a test may be made. The operational condition may also include detection of storm conditions at the turbine site, detection of high load signals, detection of specific failure signals.

Example embodiments of the invention have been described for the purposes of illustration only, and not to limit the scope of the invention as defined in the accompanying claims.

The invention claimed is:

1. A method of operating a wind turbine, the wind turbine comprising a rotor with at least one pitch adjustable rotor blade, where the at least one pitch adjustable rotor blade comprises a pitch actuator for adjusting a pitch angle, the method comprising:
    applying a pitch actuation signal to the pitch actuator, the pitch actuation signal being conditioned to promote active blade vibration; and
    determining at least one parameter relating to the active blade vibration, wherein promoting the active blade vibration is conducted by:
        receiving an edgewise load signal for the at least one pitch adjustable rotor blade, the edgewise load signal being measured in a rotating reference frame;
        applying an m-blade coordinate transformation to the edgewise load signal to transform the edgewise load signal to a whirling reference frame along a first and a second reference direction;
        selecting a signal component of either the first or the second reference direction to obtain a selected signal component;
        filtering the selected signal component at either a backward whirling frequency or a forward whirling frequency to obtain a filtered signal component;
        applying an inverse m-blade coordinate transformation to the filtered signal component to obtain a pitch modification signal; and
        setting the pitch modification signal the pitch actuation signal for the at least one pitch adjustable rotor blade to actively promote blade vibrations.

2. The method of claim 1, wherein while the pitch actuation signal is being applied, a selected monitoring parameter is monitored, and when the selected monitoring parameter reaches a threshold, promotion of the active blade vibration is stopped.

3. The method of claim 1, wherein a selected monitoring parameter is detected, and wherein the at least one parameter relating to the active blade vibration is determined on g basis of a decay of the selected monitoring parameter.

4. The method of claim 1, wherein the determination of the at least one parameter is based on a sensor signal.

5. The method of claim 1, wherein the pitch actuation signal is a time varied signal.

6. The method of claim 1, wherein the application of the pitch actuation signal is correlated with a blade position in a rotor plane of the rotor, such that the application of the pitch actuation signal is conducted in a predefined angular range within the rotor plane.

7. The method of claim 1, wherein the rotor is rotating at a controlled speed, and wherein Dromotion of the active blade vibration is conducted while the rotor is rotating.

8. The method of claim 1, wherein the filtering of the selected signal component comprises applying a bandpass filter at the backward whirling frequency or the forward whirling frequency.

9. The method of claim 1, wherein the determination of the at least one parameter relating to the active blade vibration is done a number of times to establish a baseline for the at least one parameter relating to the active blade vibration, and wherein after a period of operation has endured, a test determination of the at least one parameter relating to the active blade vibration is done and compared to the baseline.

10. The method of claim 9, wherein the test determination is done by using a distance measure between the test determination of the at least one parameter and the baseline.

11. The method of claim 1, wherein the method further comprises detecting an operational condition of the wind turbine, and when the operational condition fulfils a test criterion, the method is automatically performed.

12. The method of claim 11, wherein the operational condition is selected as one of a low wind condition and a service mode.

13. A control system for a wind turbine, the wind turbine comprising a rotor with at least one pitch adjustable rotor blade, where the at least one pitch adjustable rotor blade comprises a pitch actuator for adjusting a pitch angle; the control system comprising:
    a pitch actuation unit being configured to actively promote blade vibration in response to a pitch actuation signal being applied to the pitch actuator; and
    a control module being configured to determine at least one parameter relating to the active blade vibration, wherein promoting the active blade vibration is conducted by:
        receiving an edgewise load signal for the at least one pitch adjustable rotor blade, the edgewise load signal being measured in a rotating reference frame;
        applying an m-blade coordinate transformation to the edgewise load signal to transform the edgewise load signal to a whirling reference frame along a first and a second reference direction;
        selecting p signal component of either the first or the second reference direction to obtain a selected signal component;
        filtering the selected signal component at either a backward whirling frequency or a forward whirling frequency to obtain a filtered signal component;
        applying an inverse m-blade coordinate transformation to the filtered signal component to obtain a pitch modification signal; and
        setting the pitch modification signal the pitch actuation signal for the at least one pitch adjustable rotor blade to actively promote blade vibrations.

14. The control system of claim 13, wherein the control module is configured to stop promotion of the active blade vibration when the at least one parameter reaches a threshold.

15. The control system of claim 13, the control module is configured to determine the at least one parameter by monitoring a decay of the at least one parameter.

16. The control system of claim 13, wherein the pitch actuation signal is a time varied signal.

17. A computer program product comprising a non-transitory computer readable medium storing software code which, when executed on a data processing system, performs an operation controlling a wind turbine, the wind turbine comprising a rotor with at least one pitch adjustable rotor blade, where the at least one pitch adjustable rotor blade comprises a pitch actuator for adjusting a pitch angle; the operation comprising:

applying a pitch actuation signal to the pitch actuator, the pitch actuation signal being conditioned to actively promote blade vibration on the at least one pitch adjustable rotor blade; and determining at least one parameter relating to the active blade vibration, wherein promoting the active blade vibration is conducted by:
receiving an edgewise load signal for the at least one pitch adjustable rotor blade, the edgewise load signal being measured in a rotating reference frame;
applying an m-blade coordinate transformation to the edgewise load signal to transform the edgewise load signal to a whirling reference frame along a first and a second reference direction;
selecting a signal component of either the first or the second reference direction to obtain a selected signal component;
filtering the selected signal component at either a backward whirling frequency or a forward whirling frequency to obtain a filtered signal component;
applying an inverse m-blade coordinate transformation to the filtered signal component to obtain a pitch modification signal; and
setting the pitch modification signal the pitch actuation signal for the at least one pitch adjustable rotor blade to actively promote blade vibrations.

* * * * *